United States Patent [19]
Mattson, Jr. et al.

[11] Patent Number: 6,115,809
[45] Date of Patent: Sep. 5, 2000

[54] COMPILING STRONG AND WEAK BRANCHING BEHAVIOR INSTRUCTION BLOCKS TO SEPARATE CACHES FOR DYNAMIC AND STATIC PREDICTION

[75] Inventors: James S. Mattson, Jr., Campbell; Lacky V. Shah, Fremont; William B. Buzbee, Half Moon Bay, all of Calif.

[73] Assignee: Hewlett-Packard Company, Palo Alto, Calif.

[21] Appl. No.: 09/070,442

[22] Filed: Apr. 30, 1998

[51] Int. Cl.$^7$ ................................................. G06F 15/00
[52] U.S. Cl. ................................. 712/239; 717/5; 717/8
[58] Field of Search .......................... 712/239; 395/704, 395/708; 717/5, 8

[56] References Cited

U.S. PATENT DOCUMENTS

| | | | |
|---|---|---|---|
| 5,659,752 | 8/1997 | Heisch et al. | 717/4 |
| 5,687,360 | 11/1997 | Chang | 712/240 |
| 5,752,014 | 5/1998 | Mallick et al. | 712/240 |
| 5,805,878 | 9/1998 | Rahman et al. | 712/239 |
| 5,857,104 | 1/1999 | Natarjan et al. | 717/5 |
| 5,933,628 | 8/1999 | Chang | 712/233 |

*Primary Examiner*—Kenneth S. Kim
*Attorney, Agent, or Firm*—David A. Plettner

[57] ABSTRACT

A method and apparatus varies branch prediction strategy associated with branch instructions in a trace of program code. The present invention first profiles branch instructions within a trace to record branching behavior. Next, the present invention partitions branch instructions into groups of branch instructions that can be statically predicted and groups of branch instructions that can be dynamically predicted. Branch instructions that are profiled to have "strong" branching behavior (e.g., the same branch direction is taken 80% of the time) are placed in the group of branch instruction that are statically predicted. Branch instructions that are profiled to have "weak" branching behavior (e.g., the same branch direction is taken 60% of the time) are placed in the group of branch instruction that are dynamically predicted. Finally, branch instructions are adjusted by associating an indication of prediction strategy with each profiled branch instruction. In an embodiment of the present invention, dynamic and static code caches are defined in physical memory by allocating pools of memory pages that have prediction flags set to dynamic and static, respectively. In this embodiment, the trace is translated into the dynamic and static caches by moving branch instruction and basic blocks of code associated with branch instructions into the appropriate code cache based on the groups into which the branch instructions were partitioned. The present invention may be used when a program is originally compiled or when a program is recompiled after a profile-based optimization run. Additionally, the present invention may be used as part of a run-time optimization strategy.

15 Claims, 5 Drawing Sheets

COMPILING STRONG AND WEAK BRANCHING BEHAVIOR INSTRUCTION BLOCKS TO SEPARATE CACHES FOR DYNAMIC AND STATIC PREDICTION

CROSS REFERENCE TO RELATED APPLICATION

The present application contains subject matter related to a co-pending U.S. Patent Application entitled "A Method And Apparatus For Using Static Branch Predictions Hints With Dynamically Translated Code Traces to Improve Performance" by Lacky V. Shah et. al. This application was filed on Apr. 30, 1998, which is the same date as the filing date of the present application, names the same inventors as the present application, is assigned to the same assignee as the present application, has been assigned U.S. application Ser. No. 09/070,585, and is hereby incorporated by reference.

FIELD OF THE INVENTION

The present invention relates to the execution of computer instructions in a computer system. More specifically, the present invention relates to a method and apparatus for varying branch prediction strategy.

DESCRIPTION OF THE RELATED ART

Early computer systems serially executed one computer instruction at a time, and did not start executing an instruction until the previous instruction had completed. As the art of computer design progressed, computer designers began to incorporate various types of parallelism into computer systems.

One type of parallelism is pipelining. Pipelining breaks down the execution of a computer instruction into various steps, and processes multiple instructions simultaneously by overlapping these steps. Another type of parallelism is superscaling. Superscaling uses multiple execution units to process separate instructions simultaneously.

Branch instructions can limit the advantages provided by parallel design techniques. Often, when a branch instruction is executed, the condition that the branch instruction must test has not yet been determined. Early computer systems simply halted execution of the branch instruction (and subsequent instructions) until the condition was determined. However, this negatively affects performance. For example, in a pipelined computer often the pipeline must be emptied before the condition can be determined, which limits the benefits achieved by pipelining.

To address this problem, computer designers started to include mechanisms that predict branch behavior. When a branch instruction is encountered, the branch behavior of the branch instruction is predicted. Later, when the condition can be evaluated, the prediction is also evaluated to determine if it is correct. If the prediction is correct, execution continues and the advantages achieved by parallel execution are preserved. If the prediction is incorrect, instructions that were provisionally executed must be purged from the pipeline and the instructions from the correct branch must be executed. However, the penalty for an incorrect branch is typically not any worse than halting execution and waiting for the condition to be determined.

The performance gains achieved by branch prediction are, of course, strongly related to the accuracy of the prediction. Accordingly, many techniques have been developed to provide accurate branch predictions. One of the earliest techniques was to simply predict that a branch is always taken. Statistically, most branches are taken, so this technique proved somewhat successful. A similar technique predicts that backward branches are always taken, and forward branches are never taken.

Another technique uses an address table of addresses to which branch instructions recently branched. Typically, the table consists of an associative memory having 4 to 8 entries. If an address in a branch instruction also appeared in the table, then that address is used as the predicted execution path.

A more sophisticated approach was disclosed by James E. Smith in U.S. Pat. No. 4,370,711. Smith disclosed a random access memory (RAM) having, for example, 16 entries, each containing a two bit count capable of assuming the values +1, 0, −1, and −2. A hash mechanism transforms the branch instruction address into a four bit address that accesses the RAM. If the value stored in an entry associated with a branch instruction is +1 or 0, then the branch is predicted as taken. Otherwise, the prediction is that the branch is not taken. After the branch instruction is executed, if it is taken, the count memory entry is incremented up to a limit of +1. If it is not taken, the count memory address is decremented down to a limit of −2. The prediction scheme disclosed by Smith incorporates branch history in the formulation of the branch prediction. For example, if the branch has been taken several times, it must be not taken twice in a row to change the prediction. Many computer systems use some variation of this scheme, with a table that stores a prediction and a hash function that associates a branch instruction with a prediction.

Another approach is disclosed by Hanan Potash in U.S. Pat. No. 4,435,756. Potash discloses encoding a branch prediction in each branch instruction based on whether it is probable that the branch condition will be evaluated as being true or false. In another embodiment, Potash discloses encoding branch history and a branch prediction in a branch instruction. In this embodiment, if the prediction proves to be incorrect two times in a row, the prediction is changed, which requires encoding a new prediction into the branch instruction and writing the branch instruction back to memory. Note that the branch instruction must also be written back to memory whenever branch history changes, even if the prediction does not change. This creates a large amount of write data, which lowers I/O throughput. For example, a branch instruction that alternates between two branch paths must be written back to memory every time it is executed.

Certain computer systems manufactured by Hewlett-Packard Company have used two types of branch prediction; a hardware-based branch prediction scheme that uses a prediction table to store dynamically generated branch predictions close to the CPU, and a software-based branch prediction scheme that encodes static branch predictions into each branch instruction when a computer program is compiled. With software-based branch prediction, the prediction is encoded in the branch instruction based on the order of the operands in the compare function. Specifically, if the first register number is lower than the second register number, backward branches will be predicted as taken and forward branches will be predicted as not taken. On the other hand, if the first register number is equal to or higher than the second register number, backward branches will be predicted as not taken and forward branches will be predicted as taken. For example, consider the following compare and branch (COMB) instructions, and assume that both instructions branch forward:

COMB,<R5, R3, Address, and
COMB,>=R3, R5, Address.

A branch prediction of "taken" will be encoded in the first instruction and a branch prediction of "not taken" will be encoded in the second instruction, even though the instructions are logically identical.

To generate effective predictions, it is necessary to perform a "profile-based optimization" (PBO) run, wherein branching behavior is observed while an application is executing in a typical computing environment. After the PBO run is complete, the user's application is recompiled to incorporate updated branch predictions based on branching behavior observed during the PBO run.

An advantage provided by prior art software-based branch prediction techniques it that the prediction can be based on behavior observed over an extended period, not just the last branch or two. Also, software-based branch prediction requires less complex, less expensive hardware. It is much simpler to design hardware that only implements a branch prediction, compared to hardware that must also judge the accuracy of predictions and update predictions accordingly.

A disadvantage of software-based branch prediction techniques is that the prediction is static and does not adapt to changes in program data or the computing environment. Once the prediction is compiled into the branch instruction, it is not changed.

An advantage provided by hardware-based branch prediction techniques is that the prediction mechanism is completely transparent to the user of the computer system. In addition, predictions adapt dynamically to changes in the computing environments that may affect branching (such as changes in information stored in databases). Also, predictions tend to be very accurate when the prediction table is large or a prediction can be associated with each instruction, as disclosed by Potash.

One disadvantage of hardware-based branch prediction is that it is expensive to implement. To increase efficiency and reduce the number of logic gates, prediction tables typically store a limited number of branch instructions and often store none or only a portion of the address of a branch instruction. This can cause the prediction scheme to be overwhelmed by aliasing, thereby causing a prediction to be generated that is not based on the actual branch instruction being executed. Aliasing can be a significant problem for programs having many frequently executed branch instructions, such as database programs.

Anne M. Holler and Lacky V. Shah disclosed a method of minimizing hardware-based branch prediction aliasing in U.S. Pat. No. 5,721,893, which is entitled "Exploiting Untagged Branch Prediction Cache by Relocating Branches", is assigned to the same assignee as the present application, and is hereby incorporated by reference. In the method disclosed by Holler et al., branch instructions are divided into buckets that correspond to entries in a prediction table, thereby identifying branch instruction that will use the same entry of the branch prediction table. The method then determines whether the predictions will tend to be the same. To the extent that predictions will tend to be the same, multiple branch instructions using a common entry in the branch prediction table will not degrade performance because even if an entry is overwritten, the prediction will tend to remain the same. However, if the predictions conflict, performance will suffer because the branch predictions will overwrite each other, and thereby increase the ratio of incorrect predictions. Holler et al. teach that branch instruction positions can be adjusted to cause branch instructions to be moved into buckets in which all branch instructions likely have the same prediction.

Douglas V. Larson disclosed a method of dynamically adjusting static predictions in U.S. Pat. No. 5,838,962, which is entitled "Interrupt Driven Dynamic Adjustment of Branch Predictions", is assigned to the same assignee as the present application, and is hereby incorporated by reference. As taught in this patent, a branch prediction associated with a branch instruction is adjusted by periodically interrupting the central processing unit of a computer and executing a prediction adjustment routine that observes a pending branch instruction. If a branch instruction is not pending, the prediction adjustment routine ends and execution of the interrupted instruction stream resumes. If a branch instruction is pending, the branch instruction is evaluated and compared with a branch prediction associated with the branch instruction. If the prediction is correct, execution of the interrupted instruction stream is resumed. If the prediction is not correct, then the prediction is evaluated to determine whether it should be changed. In one embodiment disclosed in this patent, prior branch history of the branch instruction is also used to determine whether the branch prediction should be changed.

SUMMARY OF THE INVENTION

The present invention is a method and apparatus for varying the branch prediction strategy associated with branch instructions in a trace of program code. The present invention first profiles branch instructions. Branch instructions may be profiled using a variety of techniques, such as performing a profile-based optimization (PBO) run to gather profile information, inserting instrumentation code into the trace, or during run-time as disclosed in the co-pending U.S. Patent Application entitled "A Method And Apparatus For Using Static Branch Predictions Hints With Dynamically Translated Code Traces to Improve Performance" by Lacky V. Shah et. al., which was incorporated by reference above. Of course, some branch instructions may be easily profiled at compile time, such as an unconditional branch instruction that branches to a static address.

Next, the present invention partitions branch instructions into groups of branch instructions that can be statically predicted, groups of branch instructions that can be dynamically predicted, and groups of branch instructions that are executed infrequently and therefore the prediction strategy does not significantly affect performance. Branch instructions that are profiled to have "strong" branching behavior (e.g., the same branch direction is taken 80% of the time) are placed in the group of branch instruction that are statically predicted. Branch instructions that are profiled to have "weak" branching behavior (e.g., the same branch direction is taken 60% of the time) are placed in the group of branch instruction that are dynamically predicted.

Finally, branch instructions are adjusted by associating an indication of prediction strategy with each profiled branch instruction. Certain computer systems manufactured by the Hewlett-Packard Company define an architecture that associates a prediction flag with each physical memory page, with the prediction flag determining whether branch instructions within that memory page will be predicted dynamically or statically. In an embodiment of the present invention optimized for this architecture, dynamic and static code caches are defined in physical memory by allocating pools of memory pages that have their respective prediction flag set to dynamic and static, respectively. In this embodiment, the trace is translated into the dynamic and static caches by moving branch instruction and basic blocks of code associated with branch instructions into the appropriate code cache based on the groups into which the branch instructions were partitioned. The present invention may be used when a program is originally compiled or when a program is recompiled after a profile-based optimization run.

DETAILED DESCRIPTION OF THE PREFERRED EMBODIMENTS

The present invention partitions branch instructions into groups of branch instructions that can be statically predicted, groups of branch instructions that can be dynamically predicted, and groups of branch instructions that are executed infrequently and therefore the prediction strategy does not significantly affect performance. A computer program, subroutine, or other process implementing the present invention may be executed at compile time, as part of a profile-based optimization (PBO), or during run time as part of a run-time optimization procedure. Before discussing the present invention in greater detail, it is helpful to consider a typical computer program and certain architectural features provided by computer systems manufactured by the Hewlett-Packard Company.

Figure 1:
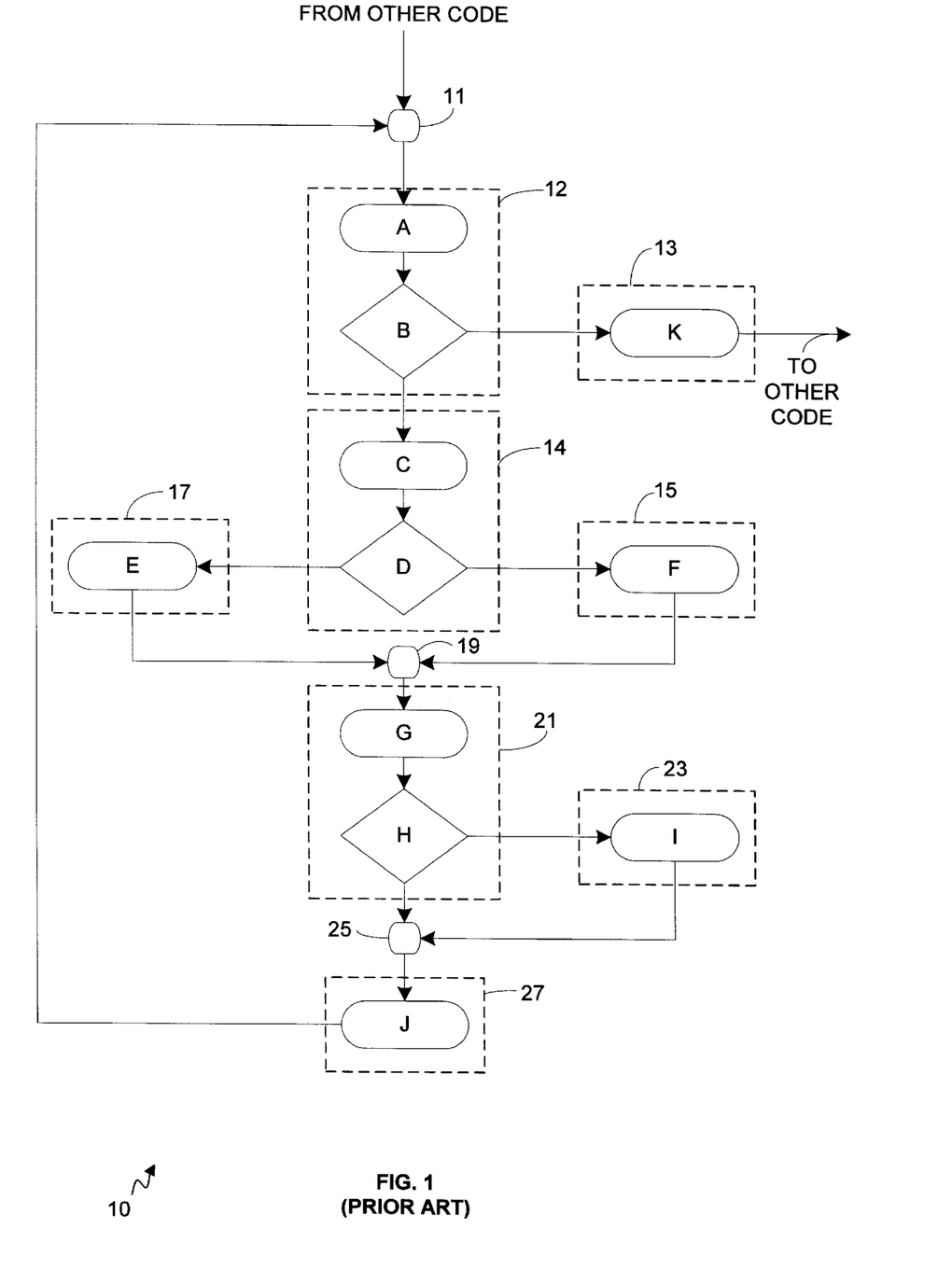
FIG. 1 illustrates a trace from prior art program code having a series of basic code blocks.

FIG. 1 illustrates a trace 10 from a prior art computer program. Trace 10 is reached from other code via node 11, which represents an address. Trace 10 includes program segments A, B, C, D, E, F, G, H, I, J, and K. Basic block 12 comprises segments A and B, basic block 13 comprises segment K, basic block 14 comprises segments C and D, basic block 15 comprises segment F, basic block 17 comprises segment E, basic block 21 comprises segments G and H, basic block 23 comprises segment I, and basic block 27 comprises segment J. For the purpose of illustrating the present invention, a basic code block is a set of instructions bounded by either branch instructions or entry points. For example, segments E and G may follow each other in program order without intervening branch instructions, but an unconditional branch instruction at the end of segment F to node 19 marks the end of basic block 17 (as well as the end of block 15) and the beginning of basic block 21.

Many pipelined processors execute one or more instructions immediately after a branch instructions before changing the flow of execution if the branch is taken. As is known in the art, in such a pipelined processor the instruction slot immediately after a branch instruction is known as a "delay slot". For the purposes of describing the present invention, any instructions in delay slots that exist in the shadow of a branch instruction are members of the basic block that includes the branch instruction.

Figure 2:
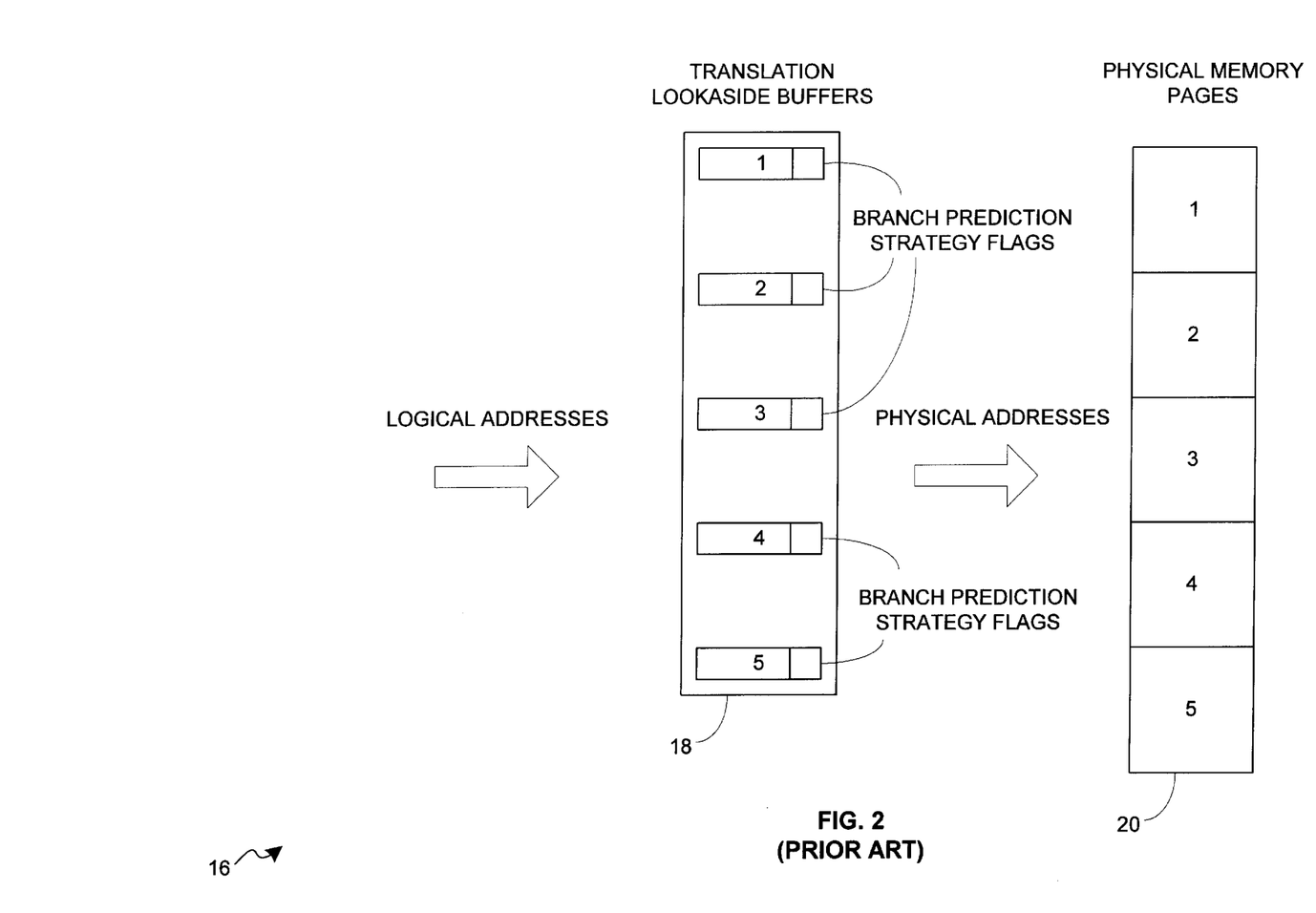
FIG. 2 is a diagram showing a portion of a prior art memory system and illustrates how branch prediction strategy may be adjusted in certain computers manufactured by the Hewlett-Packard Company.

FIG. 2 is a diagram showing a portion of a prior art memory system 16. FIG. 2 illustrates how branch prediction strategy may be adjusted in certain computers manufactured by the Hewlett-Packard Company. In FIG. 2, translation lookaside buffers (TLBs) 18 are part of an apparatus that converts logical (or alternatively, virtual) addresses used in a computer program to physical addresses that are used to access physical memory pages 20. Each TLB includes a branch prediction strategy flag that determines whether branch instructions within the physical memory page associated with the TLB should be predicted using a dynamic or a static prediction strategy. Dynamic and static predictions strategies are described above in the section entitled "Description of the Related Art". The remainder of the functionality provided by TLBs 18 is not necessary to understand the present invention. The concept important to understanding the present invention is that a flag associated with each physical memory page determines the branch prediction strategy for branch instructions within that page.

In the prior art, branch prediction strategy was typically defined for each program using a compiler option, and many prior art techniques exist for profiling branch behavior by instrumenting code. For example, in U.S. Pat. No. 5,721,893 to Holler et al., which involves hardware-based dynamic branch prediction and was incorporated by reference above, branch instructions are profiled to determine whether locations of branch instructions should be adjusted to cause predictions which tend to be taken to use one set of entries in a hardware-based branch prediction table, and predication which tend to not be taken to use another set of entries in a hardware-based branch prediction table. In addition, it is known in the art to optimize software-based static predictions by performing a profile-based optimization (PBO) run to gather profile information, and recompiling the program using the profile information. One common method of instrumenting code is to simply insert an instrumentation branch instruction before each program branch instruction. The instrumentation branch instruction branches to instrumentation code that evaluates and records the branching behavior of the branch instruction that is about to be executed. The behavior may be observed and averaged over many execution cycles. These techniques may be used to collect branching behavior during a PBO run, or during dynamic execution if the code is to be dynamically optimized. Of course, some branch instructions may be easily profiled at compile time, such as an unconditional branch instruction that branches to a static address.

Another technique for gathering profile information is to interrupt the processor to evaluate pending branch instructions. As disclosed by Douglas V. Larson in U.S. application Ser. No. 08/840,080, which was incorporated by reference above, a branch prediction associated with a branch instruction may be adjusted by periodically interrupting the processor of a computer and executing a prediction adjustment routine that observes a pending branch instruction. The method taught in this application may be modified to execute a prediction profile routine instead of the prediction adjustment routine disclosed by Larson.

Figure 3:
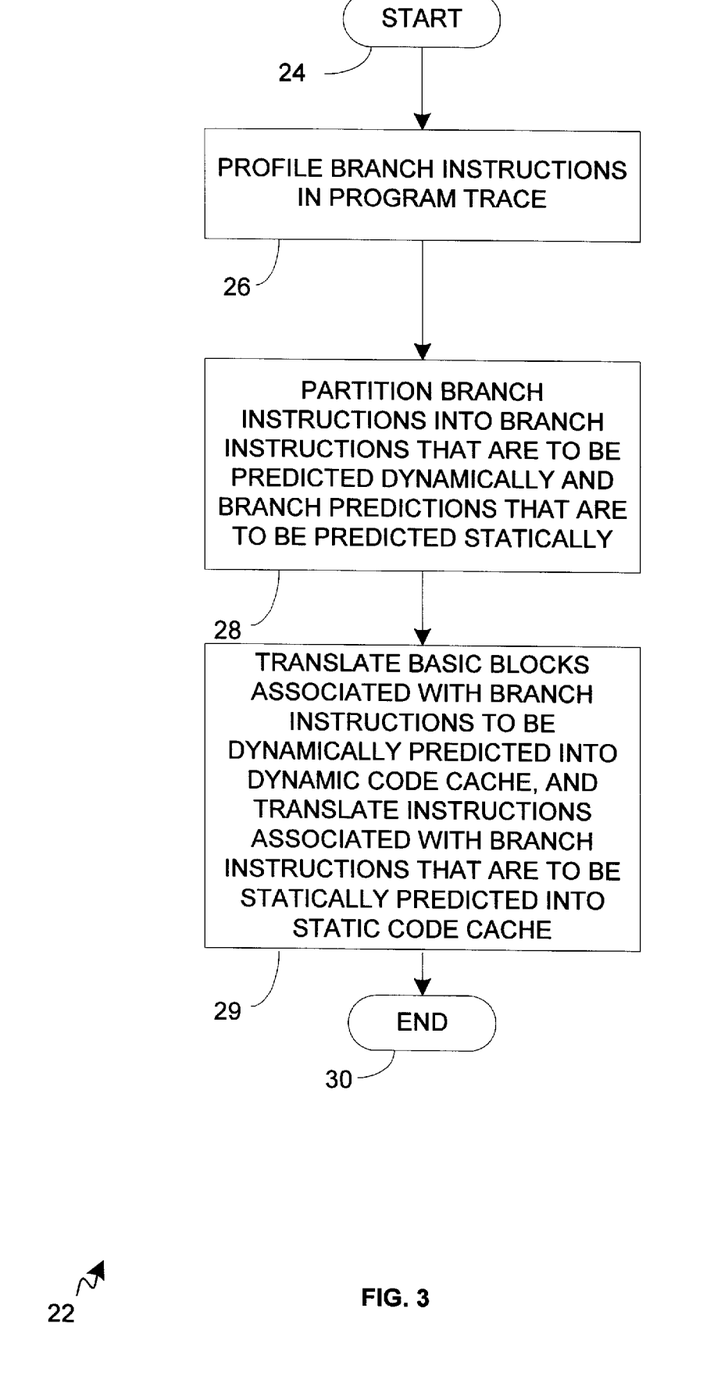
FIG. 3 is a flowchart illustrating how branch prediction strategy may be varied for branch instructions in accordance with the present invention.

FIG. 3 is a flowchart 22 illustrating how branch prediction strategy may be varied for branch instructions in accordance with the present invention. The algorithm shown in FIG. 3 may be executed once at compile time or after a PBO run, or may be executed continuously as part of a dynamic run-time optimization strategy.

Flowchart 22 begins at block 24. Block 26 profiles branch instructions using techniques such as those described above, or any other techniques known in the art. Control then passes to block 28, which partitions branch instructions into a first group of branch instructions that are to be predicted dynamically and a second group of branch instructions that are to be predicted statically. Control then passes to block 29, which translates basic blocks associated with branch instructions to be dynamically predicted into a dynamic code cache, and translates instructions associated with branch instructions that are to be statically predicted into a static code cache. Finally, the algorithm ends at block 30. As indicated above, blocks 26, 28, and 29 may be repeated continuously if the present invention is to be used with a dynamic run-time optimization strategy.

Figure 4:
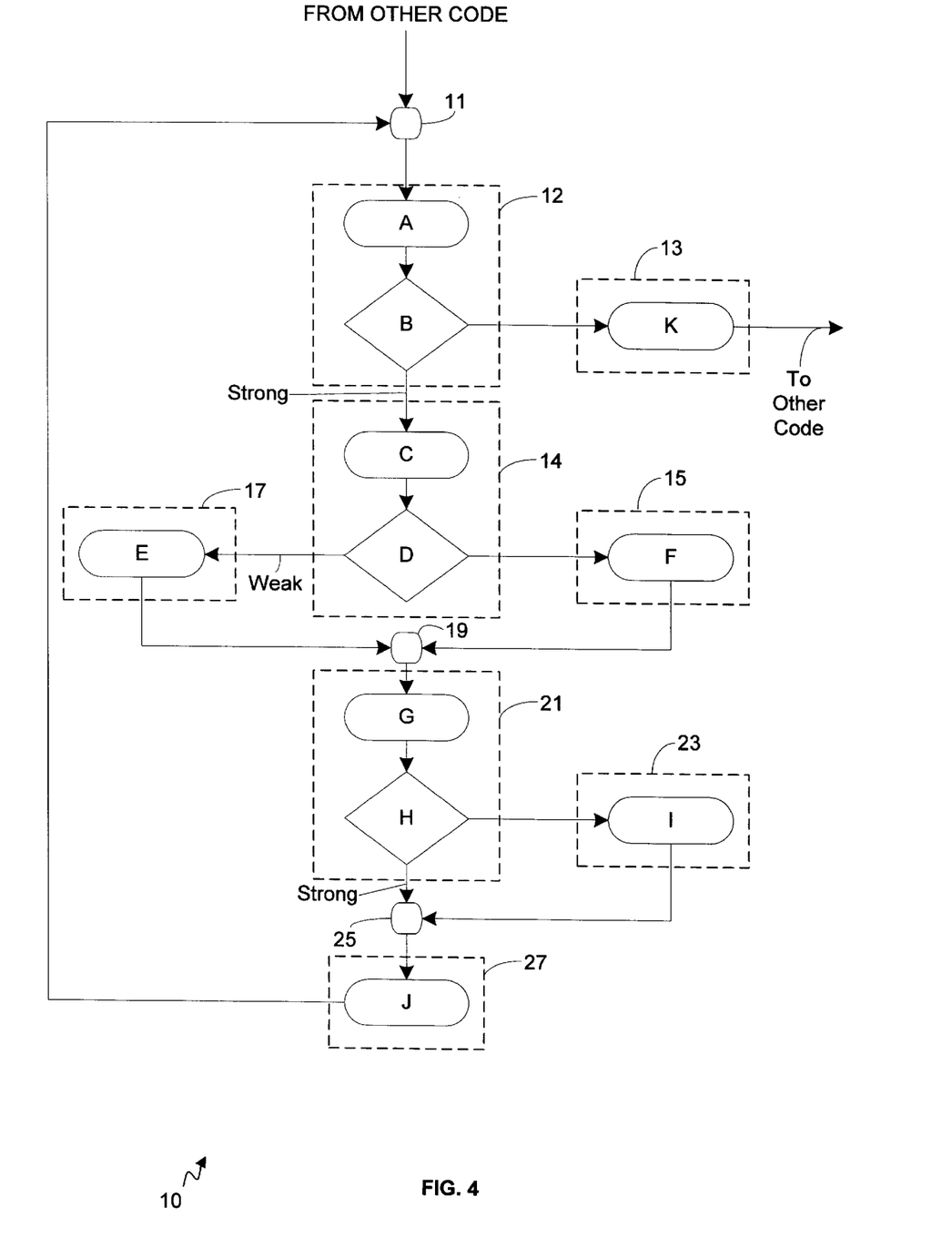
FIG. 4 shows the trace from the prior art program code of FIG. 1 after the trace been profiled in accordance with the present invention.

FIG. 4 shows trace 10 of the prior art computer program in FIG. 1 after trace 10 has been profiled in accordance with block 26 of flowchart 22 of FIG. 3 and branch instructions have been partitioned in accordance with block 28 of flowchart 22 of FIG. 3. Each conditional branch instruction has been assigned either a "strong" status or a "weak" status associated with the branch direction that is taken the majority of the time. A strong branch direction may, for example, be taken 80% of the time, while a weak branch direction may, for example, be taken 60% of the time. Note that the dividing line between strong and weak may be determined by one who is implementing the present invention through proper experimentation and simulation. In accordance with the present invention, a predefined percentage may be used. For example, branch instructions that take the same branch direction between 50% and 75% of the time may be considered weak, while branch instructions that take the same branch direction between 75% and 100% of the time may be considered strong. Alternatively, it may be desirable to have a variable percentage. For example, one may wish to have 60% of the branch instructions profiled as strong, and 40% profiled as weak. Such a variable percentage may be implemented by assigning a "percentage taken" value to each branch instruction, ranking the branch instructions from strongest to weakest, and then partitioning the branch instructions to achieve the desired ratio of strong and weak branch instructions. Of course, these techniques may also be combined. One may wish to identify branch instructions that take the same branch direction between 50% and 60% of the time as weak, identify branch instructions that take the same branch direction between 90% and 100% as strong, and use a variable percentage to partition branch instructions that take the same branch direction between 60% and 90% of the time.

Figure 5:
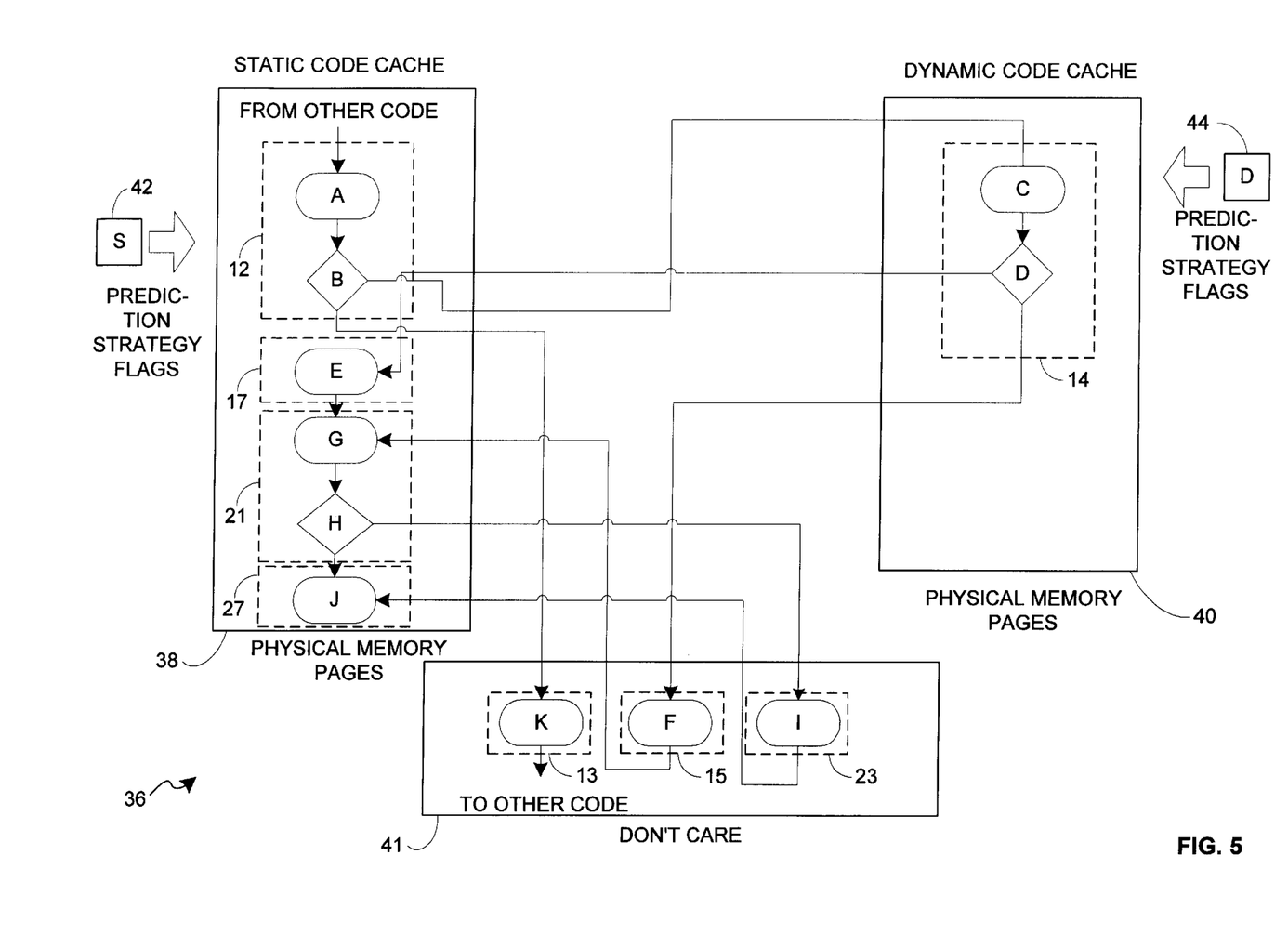
FIG. 5 shows a trace derived from the trace of FIG. 4 after the trace of FIG. 4 has been partitioned in accordance with the present invention.

FIG. 5 shows trace 36, which represents trace 10 of FIG. 4 after trace 10 has been translated in accordance with block 29 of flowchart 22 of FIG. 3. In FIG. 5, the basic code blocks that end with a branch instruction having a strong branch direction are stored in static code cache 38, and basic code blocks that end with a branch instruction having a weak branch direction are stored in dynamic code cache 40. Other blocks which are not on the path of blocks that are predicted as taken are stored in "don't care" box 41, which will be described below.

Prediction strategy flags 42 and 44 represent the branch prediction flags associated with the memory pages that comprise static code cache 38 and dynamic code cache 40, respectively. As shown in FIG. 2, certain prior art computer systems manufactured by the Hewlett-Packard Company include a branch prediction strategy flag in each translation lookaside buffer (TLB). The branch prediction strategy flag in each TLB determines the branch prediction strategy of branch instructions residing in the physical memory pages associated with the TLB. Accordingly, in such a computer system, all the branch prediction strategy flags in all the TLBs associated with the physical memory pages that comprise static code cache 38 are set to "static", and all branch prediction strategy flags in all the TLBs associated with the physical memory pages that comprise dynamic code cache 40 are set to "dynamic".

Returning to FIG. 4, some basic code blocks are reached when a conditional branch instruction fails. Reaching a basic code block in this manner will be referred to herein as a "fallthrough". Other basic code blocks are reached when a branch is taken. In FIG. 5, a straight line connecting a first basic code block to a second basic code block immediately below it indicates that the second basic code block is reached from the first basic code block via a fallthrough. The remainder of code blocks are reached by branching.

When partitioning basic blocks between dynamic and static code caches, it is desirable to maximize fallthroughs and minimize branches because fallthroughs are more efficient than branches. Some of these techniques include:

1) Alternating the pages forming the dynamic and static code caches in memory. By alternating code cache pages, it is possible to arrange code such that a "static" basic code block can fall into a "dynamic" basic code block, and vice versa. However, statistically approximately one-sixth of instructions are branch instructions, and memory blocks may be as large as several kilobytes. Accordingly, the opportunities for using this technique may be limited.

2) Replicating basic blocks to maximize fallthroughs and minimize branches. This technique is often used in the art to optimize code performance. For example, "loop unrolling" is a technique known in the art wherein loops are unrolled into a longer stream of instructions to minimize the number of times the branch instruction at the end of the loop is executed.

3) Swapping branches and fallthroughs. Often when code is partitioned between code caches, opportunities arise to swap a branch with a fallthrough, and thereby preserve a fallthrough.

Returning to FIG. 4, the branch direction from segment B to segment C has been profiled as "strong". Accordingly, in FIG. 5 segments A and B (basic block 12) have been placed in static code cache 38. In FIG. 4, the branch from segment D to segment E has been profiled as "weak". Accordingly, in FIG. 5 segments C and D (basic block 14) has been placed in dynamic code cache 40. Returning to segment B, the conditional branch instruction represented by segment B is encoded with a static prediction to branch to segment C. In addition, an unconditional branch instruction branching to segment K (basic block 13) is placed in segment B after the conditional branch statement. Since the conditional branch instruction will usually be taken to segment C, the unconditional branch instruction will rarely be executed. In addition, since segment K (basic block 13) will rarely be reached, it does not matter whether is segment k is placed in the static or dynamic code cache, or is executed by emulation.

As discussed above, basic block 14 was placed in dynamic code cache 40 because the branch direction from the conditional branch instruction of segment D to segment E (basic block 17) has been profiled as "weak". Accordingly, the path of the conditional branch instruction of segment D will be predicted by the hardware branch prediction mechanism of the processor executing the branch instruction. In addition, an unconditional branch instruction branching to segment F (basic block 15) is placed in segment D after the conditional branch instruction. Similar to segment K, segment F has also been placed in "don't care" block 41 and ends in an unconditional branch instruction that branches to segment G of basic block 21.

In FIG. 4, the branch direction from segment H to segment J has been profiled as "strong". Accordingly, segments G and H (basic block 21) has been placed in static code cache 38. In addition, since segment G can be reached via a fallthrough from segment E (basic block 17), segment E is placed immediately above segment G in static code cache 38. Likewise, since segment J (basic block 27) can be reached via a fallthrough from segment H, segment J is placed in static code cache 38 immediately after segment H. In addition, the conditional branch instruction of segment H is encoded with a static prediction to fallthrough to segment J. Segment I (basic block 23) is the target of the conditional branch instruction of segment H and is placed in "don't care" block 41 because it will rarely be reached. Segment I ends with an unconditional branch to segment J. Finally, segment J ends with an unconditional branch to segments A.

The discussion above illustrates how basic code blocks are partitioned between dynamic and static code caches. In summary, blocks are profiled as static or dynamic based on the ratio at which branches are taken, and placed in the proper code cache. The code is optimized to maximize fallthroughs.

The present invention may also be implemented in an architecture that allows prediction strategy to be assigned for each branch instruction. For example, assume that an architecture provided a strategy flag and a prediction flag in each branch instruction, with the strategy flag assuming either a "static" or "dynamic" state and the prediction flag indicating the prediction if the strategy flag is set to "static". In such an architecture, block 29 in flowchart 22 of FIG. 3 would simply be implemented to step through each basic code block and adjust the conditional branch instruction of each code block to match the profile associated with each block.

The present invention may also be used in conjunction with the method disclosed by Anne M. Holler and Lacky V. Shah in U.S. Pat. No. 5,721,893, which was incorporated by reference above. In step 29 in flowchart 22 in FIG. 3, branch predictions that are profiled as "weak" and are placed in the dynamic code cache can be further divided into branch instructions that are likely to be taken and branch instructions that are likely to fallthrough. Thereafter, the branch instructions in the dynamic code cache can be further processed in accordance with the method disclosed be Holler et al., thereby increasing the likelihood that branch instructions having the same prediction will access the same entries of a hardware-based branch prediction table.

The present invention may be used when a program is originally compiled or when a program is recompiled after a profile-based optimization run. Additionally, the present invention may be used as part of a run-time optimization strategy. With the advent of platform independent programming languages, such as the JAVA® programming language originally defined by Sun Microsystems, Inc., it will be increasing common for source code or intermediate code to be delivered directly to a computer system upon which the code will be immediately compiled and executed. Since the user will be waiting for the program to be compiled, it is not practical to spend time profiling the code. Traditional compilers consume considerable processor resources when compiling and optimizing, but a "just-in-time" compiler will not have this luxury. Accordingly, a "just-in-time" compiler provided with the present invention can optimize the code as it is executed, thereby providing the user with code that begins to execute quickly, while still optimizing the code as execution continues.

Although the present invention has been described with reference to certain embodiments, workers skilled in the art will recognize that changes may be made in form and detail without departing from the spirit and scope of the invention.

What is claimed is:

1. A method of varying branch prediction strategy within a trace of program code having branch instructions comprising:
   identifying branch instructions within the trace that have a branch direction that is taken more often than not;
   partitioning the identified branch instructions into identified branch instructions that have strong branching behavior and identified branch instructions that have weak branching behavior;
   associating a basic block of instructions with each identified branch instruction that has weak branching behavior, wherein each identified branch instruction that has weak branching behavior is a member of the basic block of instructions to which it is associated;
   translating basic blocks of instructions that include branch instructions having weak branching behavior into a dynamic code cache;
   associating a basic block of instructions with each identified branch instruction that has strong branching behavior, wherein each identified branch instruction that has strong branching behavior is a member of the basic block of instructions to which it is associated;
   translating basic blocks of instructions that include branch instructions having strong branching behavior into a static code cache.

2. The method of claim 1 wherein a prediction strategy flag indicating a static prediction strategy is associated with each memory page comprising the static code cache and a prediction strategy flag indicating a dynamic prediction strategy is associated with each memory page comprising the dynamic code cache.

3. The method of claim 1 wherein a prediction strategy flag indicating a static prediction strategy is associated with each memory page comprising the static code cache.

4. The method of claim 1 wherein associating a static prediction with each identified branch instruction that has strong branching behavior comprises:
   adjusting an operand order in a conditional branch instruction.

5. The method of claim 4 wherein adjusting an operand order in a conditional branch instruction comprises:
   encoding a backward branch to be predicted as taken and forward branch to be predicted as not taken by adjusting the operand in the conditional branch instruction such that a first register number of the conditional branch instruction is lower than the second register number of the condition branch instruction; and
   encoding a backward branch to be predicted as not taken and forward branch to be predicted as taken by adjusting the operand in the conditional branch instruction such that a first register number of the conditional branch instruction is higher than the second register number of the condition branch instruction.

6. The method of claim 1 wherein a prediction strategy flag indicating a dynamic prediction strategy is associated with each memory page comprising the dynamic code cache.

7. A program storage medium having computer readable program code thereon for causing branch prediction strategy to be varied within a trace of program code having branch instructions, the program storage medium comprising:
   a first segment of computer readable program code for identifying branch instructions within the trace that have a branch direction that is taken more often than not;

a second segment of computer readable program code for partitioning the identified branch instructions into identified branch instructions that have strong branching behavior and identified branch instructions that have weak branching behavior;

a third segment of computer readable program code for associating a basic block of instructions with each identified branch instruction that has weak branching behavior, wherein each identified branch instruction that has weak branching behavior is a member of the basic block of instructions to which it is associated, and translating basic blocks of instructions that include branch instructions having weak branching behavior into a dynamic code cache;

a fourth segment of computer readable program code for associating a basic block of instructions with each identified branch instruction that has strong branching behavior, wherein each identified branch instruction that has strong branching behavior is a member of the basic block of instructions to which it is associated, and translating basic blocks of instructions that include branch instructions having strong branching behavior into a static code cache; and a fifth segment of computer readable program code for associating a static prediction with each identified branch instruction that has strong branching behavior.

8. The program storage medium of claim 7 wherein the fifth segment of computer readable program code associates a static prediction with each identified branch instruction that has strong branching behavior by adjusting an operand order in a conditional branch instruction.

9. The program storage medium of claim 8 wherein the fifth segment of computer readable code adjusts an operand order in a conditional branch instruction by encoding a backward branch to be predicted as taken and forward branch to be predicted as not taken by adjusting the operand in the conditional branch instruction such that a first register number of the conditional branch instruction is lower than the second register number of the condition branch instruction, and encoding a backward branch to be predicted as not taken and forward branch to be predicted as taken by adjusting the operand in the conditional branch instruction such that a first register number of the conditional branch instruction is higher than the second register number of the condition branch instruction.

10. An apparatus implemented in a computer system that varies branch prediction strategy within a trace of program code having branch instructions, the apparatus comprising:

a profiler that identifies branch instructions within the trace that have a branch direction that is taken more often than not;

a partitioner that partitions the identified branch instructions into identified branch instructions that have strong branching behavior and identified branch instructions that have weak branching behavior; and a translator that associates a dynamic prediction strategy with identified branch instructions that have weak branching behavior, associates a static prediction strategy with identified branch instructions that have strong branching behavior, and associates a static prediction with each identified branch instruction that has strong branching behavior, wherein the translator associates a static prediction strategy with identified branch instructions that have strong branching behavior by associating a basic block of instructions with each identified branch instruction that has strong branching behavior, with each identified branch instruction that has strong branching behavior being a member of the basic block of instructions to which it is associated, and translates basic blocks of instructions that include branch instructions having strong branching behavior into a static code cache, and wherein the translator associates a dynamic prediction strategy with identified branch instructions that have weak branching behavior by associating a basic block of instructions with each identified branch instruction that has weak branching behavior, with each identified branch instruction that has weak branching behavior being a member of the basic block of instructions to which it is associated, and translates basic blocks of instructions that include branch instructions having weak branching behavior into a dynamic code cache.

11. The apparatus of claim 10 and further comprising:

a prediction strategy flag indicating a static prediction strategy associated with each memory page comprising the static code cache; and a prediction strategy flag indicating a dynamic prediction strategy associated with each memory page comprising the dynamic code cache.

12. The apparatus of claim 10 and further comprising:

a prediction strategy flag indicating a static prediction strategy is associated with each memory page comprising the static code cache.

13. The apparatus of claim 10 wherein the translator associates a static prediction with each identified branch instruction that has strong branching behavior by adjusting an operand order in a conditional branch instruction.

14. The apparatus of claim 13 wherein translator adjusts an operand order in a conditional branch instruction by encoding a backward branch to be predicted as taken and forward branch to be predicted as not taken by adjusting the operand in the conditional branch instruction such that a first register number of the conditional branch instruction is lower than the second register number of the condition branch instruction, and encoding a backward branch to be predicted as not taken and forward branch to be predicted as taken by adjusting the operand in the conditional branch instruction such that a first register number of the conditional branch instruction is higher than the second register number of the condition branch instruction.

15. The apparatus of claim 10 and further comprising:

a prediction strategy flag indicating a dynamic prediction strategy associated with each memory page comprising the dynamic code cache.

* * * * *